(12) United States Patent
Smith

(10) Patent No.: US 11,317,466 B2
(45) Date of Patent: *Apr. 26, 2022

(54) REMOTE MONITORING OF GEOGRAPHICALLY DISTRIBUTED ASSETS USING MOBILE PLATFORMS

(71) Applicant: SoftBank Corp., Tokyo (JP)

(72) Inventor: James Smith, Sunnyvale, CA (US)

(73) Assignee: SoftBank Corp., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/144,182

(22) Filed: Jan. 8, 2021

(65) Prior Publication Data

US 2021/0144803 A1 May 13, 2021

Related U.S. Application Data

(63) Continuation of application No. 16/679,961, filed on Nov. 11, 2019, now Pat. No. 10,925,114.

(51) Int. Cl.
*H04W 84/06* (2009.01)
*H04B 7/185* (2006.01)
*H04W 4/029* (2018.01)

(52) U.S. Cl.
CPC ........ *H04W 84/06* (2013.01); *H04B 7/18504* (2013.01); *H04B 7/18506* (2013.01); *H04W 4/029* (2018.02)

(58) Field of Classification Search
CPC .................. H04W 4/00–029; H04W 4/38–48
See application file for complete search history.

(56) References Cited

U.S. PATENT DOCUMENTS 2,790,479 A  4/1957  Mastenbrook
3,452,949 A  7/1969  Maloney et al.
(Continued)

FOREIGN PATENT DOCUMENTS

CN  102148637 A  8/2011
CN  107404347 A  11/2017
(Continued)

OTHER PUBLICATIONS

Li, Bin et al., UAV Communications for 5G and Beyond: Recent Advances and Future Trends, IEEE Internet of Things Journal, 2018, pp. 1-23, Best Available Date: Dec. 17, 2018.
(Continued)

*Primary Examiner* — San Htun
(74) *Attorney, Agent, or Firm* — Botos Churchill IP Law

(57) ABSTRACT

The technology provides a convenient and efficient way for business entities and other organizations to gather and transmit data from remotely located facilities without having to rely on satellite communication or specialized communication equipment. A geographically isolated facility may be used for manufacturing, warehousing, power generation, environmental monitoring, as well as other services. Information about the facility, its equipment and operation are transmitted to a back end system using high altitude platforms (HAPs). This provides opportunistic communication between remote facilities and the back-end system on an as-needed basis, for example based on bandwidth usage, peak/off-peak usage, etc. The HAPs may act as a store and forward service, or process received data before transmitting it to a ground station or the back end system. This approach allows an organization to periodically monitor its facilities, to determine equipment failure, resupply needs, and to assess the status of each facility.

20 Claims, 11 Drawing Sheets

(56) References Cited

U.S. PATENT DOCUMENTS

| | | | |
|---|---|---|---|
| 4,366,936 | A | 1/1983 | Ferguson |
| 4,843,397 | A | 6/1989 | Galati et al. |
| 4,883,244 | A | 11/1989 | Challoner et al. |
| 4,987,607 | A | 1/1991 | Gilbreath et al. |
| 5,119,225 | A | 6/1992 | Grant et al. |
| 5,556,058 | A | 9/1996 | Bender |
| 6,010,093 | A | 1/2000 | Paulson |
| 6,246,502 | B1 | 6/2001 | Okada et al. |
| 6,324,398 | B1 | 11/2001 | Lanzerotti et al. |
| 6,513,758 | B1 | 2/2003 | Lloyd |
| 6,590,685 | B1 | 7/2003 | Mendenhall et al. |
| 6,628,941 | B2 | 9/2003 | Knoblach et al. |
| 6,756,937 | B1 | 6/2004 | Chang et al. |
| 6,763,195 | B1 | 7/2004 | Willebrand et al. |
| 6,830,222 | B1 | 12/2004 | Nock et al. |
| 6,842,439 | B2 | 1/2005 | Zeitfuss |
| 7,046,934 | B2 | 5/2006 | Badesh et al. |
| 7,266,257 | B1 | 9/2007 | Chowdhury et al. |
| 7,356,390 | B2 | 4/2008 | Knoblach et al. |
| 7,424,225 | B1 | 9/2008 | Elliott |
| 7,567,779 | B2 | 7/2009 | Seligsohn |
| 7,609,972 | B2 | 10/2009 | Cunningham et al. |
| 7,913,948 | B2 | 3/2011 | Porter |
| 7,948,426 | B2 | 5/2011 | Pevler et al. |
| 8,061,648 | B2 | 11/2011 | Lachenmeier |
| 8,634,974 | B2 | 1/2014 | Devaul et al. |
| 8,676,192 | B2 | 3/2014 | Jalali et al. |
| 9,148,215 | B1 | 9/2015 | Bonawitz |
| 9,306,668 | B2 | 4/2016 | Devaul et al. |
| 10,007,513 | B2 | 6/2018 | Malladi et al. |
| 10,193,761 | B1* | 1/2019 | Barritt ............... H04W 8/22 |
| 10,354,535 | B1 | 7/2019 | Bonawitz et al. |
| 2001/0043381 | A1 | 11/2001 | Green et al. |
| 2002/0004691 | A1 | 1/2002 | Kinashi et al. |
| 2002/0131123 | A1 | 9/2002 | Clark |
| 2002/0167702 | A1 | 11/2002 | Badesha et al. |
| 2003/0236070 | A1 | 12/2003 | Seligsohn |
| 2004/0065773 | A1 | 4/2004 | Morales |
| 2004/0258415 | A1 | 12/2004 | Boone et al. |
| 2005/0069325 | A1 | 3/2005 | Cicchiello et al. |
| 2005/0259991 | A1 | 11/2005 | Dudelzak et al. |
| 2006/0000945 | A1 | 1/2006 | Voss |
| 2007/0085735 | A1 | 4/2007 | Bay |
| 2007/0118286 | A1 | 5/2007 | Wang et al. |
| 2008/0047176 | A1 | 2/2008 | Thiele et al. |
| 2008/0101063 | A1 | 5/2008 | Koike et al. |
| 2008/0108385 | A1 | 5/2008 | Frost et al. |
| 2009/0103909 | A1 | 4/2009 | Giegerich et al. |
| 2009/0324236 | A1 | 12/2009 | Wu et al. |
| 2010/0039984 | A1 | 2/2010 | Brownrigg |
| 2010/0166187 | A1* | 7/2010 | Trifonov ............... B82Y 10/00 380/279 |
| 2010/0214974 | A1 | 8/2010 | Elliott |
| 2011/0034191 | A1 | 2/2011 | Leabman |
| 2011/0100201 | A1 | 5/2011 | Bass |
| 2011/0118907 | A1 | 5/2011 | Elkins |
| 2012/0013506 | A1 | 1/2012 | Halavi et al. |
| 2013/0177321 | A1 | 7/2013 | Devaul et al. |
| 2013/0179008 | A1* | 7/2013 | DeVaul ............... H04B 10/118 701/3 |
| 2013/0303218 | A1 | 11/2013 | Teller et al. |
| 2015/0236781 | A1 | 8/2015 | Jalali |
| 2016/0161258 | A1* | 6/2016 | Magson ............... G05D 1/104 701/467 |
| 2016/0182140 | A1 | 6/2016 | Devaul et al. |
| 2016/0226573 | A1* | 8/2016 | Behroozi ............... H01Q 1/28 |
| 2016/0278070 | A1 | 9/2016 | Patel et al. |
| 2017/0337218 | A1 | 11/2017 | Pasko et al. |
| 2018/0054251 | A1 | 2/2018 | Alex |
| 2018/0255378 | A1 | 9/2018 | Cella et al. |
| 2018/0323862 | A1 | 11/2018 | Gong et al. |
| 2018/0343054 | A1 | 11/2018 | Barritt |
| 2018/0362132 | A1 | 12/2018 | Allcorn et al. |
| 2019/0327007 | A1* | 10/2019 | Wang ............... H04W 72/0453 |

FOREIGN PATENT DOCUMENTS

| | | |
|---|---|---|
| EP | 1172949 A1 | 1/2002 |
| JP | 2005094181 A | 4/2005 |
| KR | 20020066611 A | 8/2002 |
| WO | 9504407 A1 | 2/1995 |
| WO | 0152453 A1 | 7/2001 |
| WO | 0159961 A1 | 8/2001 |
| WO | 02073835 A1 | 9/2002 |
| WO | 2017119931 A1 | 7/2017 |

OTHER PUBLICATIONS

Azari, Mohammad Mahdi, et al., "Ultra Reliable UAV Communication Using Altitude and Cooperation Diversity", 2017, pp. 1-30, Best Available Date: Apr. 28, 2017.

Bi, Zhuming, et al., "Internet of Things for Enterprise Systems of Modern Manufacturing", ResearchGate, IEEE Transactions on Industrial Informatics, vol. 10, No. 2, May 2014, pp. 1536-1546.

Chi, Mingmin, et al., "Big Data for Remote Sensing: Challenges and Opportunities", Proceedings of the IEEE, vol. 104, No. 11, Nov. 2016, pp. 2207-2219.

Eom, Subin, et al., "UAV-Aided Wireless Communication Designs With Propulsion Energy Limitations", IEEE School of Electrical Eng., Korea University, 2018, pp. 1-24, Best Available Date: Jan. 9, 2018.

Fang, Shifeng, et al., "An Integrated System for Regional Environmental Monitoring and Management Based on Internet of Things", IEEE Transactions on Industrial Informatics, vol. 10, No. 2, May 2014, pp. 1596-1605.

Feng, Wei, et al., "UAV-Aided MIMO Communications for 5G Internet of Things", Warwick, The University of Warwick, 2018, pp. 1-11, Best Available Date: Oct. 8, 2018.

Lee, Jay, et al., "A Cyber-Physical Systems architecture for Industry 4.0-based manufacturing systems", Elsevier, Science Direct, 2014 Society of Manufacturing Engineers, pp. 18-24, Best Available Date: Dec. 10, 2014.

Wang, Xuanxuan, et al., "Coverage Optimization for UAV-Aided Internet of Things with Partial Channel Knowledge", Journal of Communications and Information Networks, vol. 3, No. 4, Dec. 2018, pp. 55-63.

Wei, Te, et al., "Hybrid Satellite-Terrestrial Communication Networks for the Maritime Internet of Things: Key Technologies, Opportunities, and Challenges", 2019, pp. 1-23, Best Available Date: Mar. 29, 2019.

Xu, Guobao, et al., "Applications of Wireless Sensor Networks in Marine Environment Monitoring: A Survey", Sensors 2014, ISSN 1424-8220, pp. 16932-16954, Best Available Date: Sep. 11, 2014.

Zeng, Yong, et al., "Energy-Efficient UAV Communication with Trajectory Optimization", Department of Electrical and Computer Engineering, National University of Singapore, 2016, pp. 1-30, Best Available Date: Aug. 5, 2016.

Acampora et al., "A Broadband Wireless Access Network Based on Mesh-Connected Free-Space Optical Links," EEE Personal Communications, Oct. 1999, 1070-9916/99, 62-65.

Akella et al., "Building Blocks for Mobile Free-Space-Optical Networks," IEEE, 2005, 5 pages, Best Available Date: Mar. 6-8, 2005.

Akella et al., "Multi-channel Communication in Free-Space Optical Networks for the Last-mile," Local & Metropolitan I\rea Networks, 2007. LANMAN 2007. 15th IEEE Workshop on. IEEE, 2007, 6 pages, Best Available Date: Jun. 10-13, 2007.

Aragon-Zavala et al., "High-Altitude Platforms for Wireless Communications," John Wiley & Sons, Ltd., 2008, pp. 159-241.

Aragon-Zavala et al., "High-Altitude Platforms for Wireless Communications," John Wiley & Sons, Ltd., 2008, pp. 1-80.

Aragon-Zavala et al., "High-Altitude Platforms for Wireless Communications," John Wiley & Sons, Ltd., 2008, pp. 81-158.

Balaram et al., "Autonomous Mobility, Navigation and Control for Venus Aerobots," International Symposium on Artificial Intelligence, Optics and Automation in Space, Jul. 14, 1997, Tokyo, Japan, 7 pages.

(56) References Cited

OTHER PUBLICATIONS

Biswas et al., "Deep Space Optical Communications Link Availability and Data Volume," In Lasers and Applications n Science and Engineering, pp. 175-183. International Society for Optics and Photonics, 2004, Best Available Date: Jun. 16, 2004.
Bloom et al., "The Last-Mile Solution: Hybrid FSO Radio," AirFiber, Inc., May 2002, pp. 1-20.
Corbett et al., "High Altitude Balloon Project," Wright State University, Engineering Design, Mar. 11, 2006, Dayton, Ohio, pp. 1-76.
Ellinas et al, "Network Control and Management Challenges in Opaque Networks Utilizing Transparent Optical Switches," Communications Magazine, IEEE 42.2 (2004), pp. S16-S24, Best Available Date: Feb. 2004.
European Pa Tent Office, Supplementary European Search Report dated Aug. 28, 2015, issued in connection with European Application No. 13736374.3, 7 pages.
European Patent Office, European Search Report for EP 13 73 5953 dated Sep. 8, 2015, 8 pages.
Fortuna et al, "HAP based optical transport network design," Proceedings of the 15th International Electrotechnical and Computer Science Conference (ERK) Sep. 2006, pp. 1-4.
Giggenbach et al, "Optical Data Downlinks from Earth Observation Platforms," Proceedings of the SPIE, 2009, vol. 7199, pp. 1-14.
Giggenbach et al, "Optical Free-Space Communications Downlinks from Stratospheric Platforms—Overview on 15 STROPEX, the Optical Communications Experiment of CAPANINA," 14th 1st Summit, Jun. 2005, No. 483, Dresden, Germany, pp. 1-4, Best Available Date: Jan. 2005.
Grace et al., CAPANINA—Communications from Aerial Platform Networks Delivering Broadband Information for All, 4th 1st Mobile & Wireless Communications Summit, Jun. 2005, No. 252, Dresden, Germany, pp. 1-5.
Grace et al, "Integrating Users into the Wider Broadband Network via High Altitude Platforms," IEEE Wireless Communications, Oct. 2005, pp. 98-105.
Grace et al, Broadband Communications via High Altitude Platforms, John Wiley & Sons, Ltd., 2011, pp. 219-238.
Grace et al., Broadband Communications via High Altitude Platforms, John Wiley & Sons, Ltd., 2011, pp. 49-73.
Grace et al, Broadband Communications via High Altitude Platforms, John Wiley & Sons, Ltd., 2011, pp. 75-113.
Gupta, Ramesh K. "Satellite Communications Systems," Microwave and RF Product Applications. CRC Press, 2003. DP-8-1-8-18.
Horwath et al., "Broadband Backhaul Communication for Stratospheric Platforms: The Stratospheric Optical Payload Experiment (STROPEX)," SPIE Optics+ Photonics, International Society for Optics and Photonics, 2006, pp. 1-12.
Hutchinson, James, "Mobile Mesh Network Finds Interest in NGOs," available online at: http://www.computerworld.com.au/article/374682/mobile_mesh_network_finds_interest_ngos/, Jan. 27, 2011, pp. 1-15.
International Search Report and Written Opinion, PCT International Application No. PCT/US2013/020538 dated Apr. 22, 2013.
International Searching Authority, International Search Report and Written Opinion dated Apr. 25, 2013, issued in connection with International Application No. PCT/US2013.020536, filed on Jan. 7, 2013, 9 pages.
Luong et al., "Network Architecture and Protocols," CAPANINA, Oct. 16, 2006, pp. 1-83, Oct. 15, 2006.
Luong et al., "Network Architecture and Protocols," CAPANINA, Oct. 16, 2006, pp. 84-172, Oct. 15, 2006.
Mohorcic et al., "Evaluation of Wavelength Requirements for Stratospheric Optical Transport Networks,"Journal of Communications, Sep. 2009, vol. 4, No. 8, 588-596.
Mullins, Justin, "NASA Develops 'Smart' Weather Balloons for Launch Sites," NewScientist, May 23, 2007, pp. 1-3.
Nadeem et al., Comparison of link selection algorithms for free space optics/radio frequency hybrid network, 2011, The Institution of Engineering and Technology, pp. 2751-2759.
Ozdaglar, et al., "Routing and Wavelength Assignment in Optical Networks," IEEE/ACM Transactions on Networking (TON) 11.2 (2003), pp. 259-272.
Rui et al., "Inter-satellite Ranging System Design in Formation," 2nd International Symposium on Systems and Control in Aerospace and Astronautics, IEEE, 2008, 5 pages, Best Available Date: Dec. 10-12, 2008.
Smadi, et al., "Free-Space Optical Gateway Placement in Hybrid Wireless Mesh Networks," Journal of Lightwave Technology, Jul. 15, 2009, vol. 27, No. 14, pp. 2688-2697.
Son, In Keun, "Design and Optimization of Free Space Optical Networks," Auburn University, Dec. 13, 2010, pp. 79-147, Auburn, Alabama.
Son, In Keun, "Design and Optimization of Free Space Optical Networks," Auburn University, Dec. 13, 2010, pp. 1-78, Auburn, Alabama.
Thornton et al., "Broadband communications from a high-altitude platform: the European HeliNet programme," electronics & Communication Engineering Journal, Jun. 2001, pp. 138-144.
Tozer et al., "High-altitude platforms for wireless communications," Electronics & Communication Engineering Journal, Jun. 2001, pp. 127-137.
Walsh, Barry William, "Balloon Network Test Successful," Taylor University News, May 11, 2007, 1 page.
Wang et al., "Minimization of acquisition time in short-range free-space optical communication," Applied Optics, Dec. 20, 2002, pp. 7592-7602, vol. 41, No. 36.
Wang, et al., "Throughput Capacity of Hybrid Radio-Frequency and Free-Space-Optical (RF/FSO) Multi-Hop Networks," Information Theory and Applications Workshop, 2007. IEEE, 2007, pp. 1-8, Best Available Date: Jan. 29-Feb. 2, 2007.
Willner et al., "Physical Layer Routing in Free-Space Optical Networks," LEOS, available online at: http://:>hotonicssociety_org/newsletters/octo5/physical_layer .html, Nov. 17, 2011, pp. 1-6, Best Available Date: Jul. 25-27, 2005 by IEEE.
Zang, et al., "A Review of Routing and Wavelength Assignment Approaches for Wavelength-Routed Optical WDM Networks," Optical Networks Magazine, Jan. 2000, pp. 47-60.
Carten, Jr., Andrew S, "An Investigation of the Applicability of High Altitude, Lighter-Than-Air (LTA) Vehicles to the 10 Tactical Communications Relay Problem," Air Force Cambridge Research Labs, Hanscom Air Force Base, Aug. 20, 1974, Massachusetts, pp. 1-62.
International Search Report and Written Opinion for Application No. PCT/US20/59626 dated Feb. 24, 2021.

* cited by examiner

500

600

700

710

REMOTE MONITORING OF GEOGRAPHICALLY DISTRIBUTED ASSETS USING MOBILE PLATFORMS

CROSS REFERENCE TO RELATED APPLICATIONS

The present application is a continuation of U.S. patent application Ser. No. 16/679,961, filed Nov. 11, 2019, the entire disclosure of which is incorporated by reference herein.

BACKGROUND

Large businesses and other organizations often have facilities situated in different locations, such as for manufacturing, warehousing, power generation, environmental monitoring, as well as other services. A given organization may periodically monitor its facilities, for instance to determine equipment failure, resupply needs and timing, and to generally assess the status of each facility. Different facilities may be in different geographic regions, countries or even continents.

The various locations may have different telecommunication capabilities and limitations. For instance, some regions may employ different landline and cellular communications standards. Other regions may be too remote and have limited or no access to reliable telecommunication links. While land-based microwave communications, satellite communications or local data storage and retrieval may be employed, these approaches can be cost prohibitive or otherwise impractical depending on the amount of information to be transmitted and the timing for when to send the information. Thus, it can be challenging to gather the necessary information from the facilities in order to make certain business operating decisions.

BRIEF SUMMARY

Aspects of the disclosure involve using high altitude platforms (HAPs), including balloons or other unmanned aerial vehicles in the stratosphere, to provide periodic communication links between remote facilities and a back office or headquarters. By way of example, it is estimated that there are millions of deployed industrial assets current in use in industries including but not limited to mining, oil and gas, power distribution, solar generation, water distribution etc. These assets may be owned by an end user, leased to the end user by an original equipment manufacturer (OEM), or owned by the end user and serviced by the OEM. Obtaining information from geographically isolated and/or dispersed sites is a fundamental problem and can be a limiting factor for manufacturers or service providers for such equipment.

By way of example, industrial equipment such as motors, turbines, pumping stations or battery storage modules may need to provide information such as performance, localization, utilization, etc. to a remote system. This may be necessary to schedule maintenance, order replacement parts, determine productivity, etc. However, as noted above it can be challenging to effectively obtain such information from remove facilities due to geographic remoteness and infrastructure limitations. This can be especially true for facilities that are expected to operate for many years or decades, as communication equipment may become outdated and such legacy equipment may not be effectively supported. It may also be costly or inefficient to provide upgrades to the communication equipment.

In many situations the information from remote facilities may be low bandwidth (e.g., tens or hundreds of kilobytes of data, still images instead of videos, etc.), not time sensitive, or both. In these situations, periodic transmission of data can be made, for instance daily, weekly, monthly, per shift, etc. According to one aspect, a balloon, airship or other HAP-based communication platform can be employed to address the communication needs for the remote facilities. For instance, as discussed further below, such airborne platforms can facilitate opportunistic communication between remote facilities and a headquarters or other back-end office. The end users or OEMs can take advantage of the airborne platforms on an as-needed basis, for example based on bandwidth usage, peak or off-peak usage, etc.

According to one aspect of the technology, a method provides opportunistic communication between one or more remote facilities and a back end system. The method comprising determining, by one or more processors, an expected arrive time on station of a high altitude platform (HAP) for a given one of the one or more remote facilities. The HAP is part of a fleet of HAPs, for instance to supply communication services to one or more geographic regions around the globe. The method also comprises communicating to a device of the given remote facility, by the one or more processors, the expected arrival time on station and a communication window for the HAP. Upon arriving on station, the method also includes enabling communication between the HAP and the given remote facility. Data received from the given remote facility is then stored in local memory of the HAP. The data received from the given remote facility includes information about at least one of component, system or facility operation associated with the given remote facility. After storage in local memory, the received data is subsequently transmitted from the HAP to either another HAP in the fleet of HAPs or to a ground station.

In one example, the method further comprises the HAP processing the stored data to obtain processed data. In this case, transmitting the received data comprises transmitting the processed data from the HAP to either the other HAP or to the ground station. Here, processing the stored data may include one or more of performing data analysis of device or system productivity, performing a mean time between failures projection, or performing a just-in-time evaluation for resupply or inventory management.

In another example, transmitting the received data to the other HAP includes transmitting a request for the other HAP to perform processing of the received data prior to transmitting processed data to the ground station. In a further example, the method also comprises communicating to the device of the given remote facility a next expected arrival time on station and a next communication window for another HAP of the fleet of HAPs. Here, communicating the next expected arrival time on station and the next communication window for the other HAP may be initiated by the HAP or another device in the system.

In yet another example, enabling communication between the HAP and the given remote facility includes the HAP transmitting an identifier to the given remote facility. The identifier indicates arrival of the HAP on station. In this case, the identifier may include one or more selected from the group consisting of information about the HAP's communication capabilities, an amount of time available to receive information from the given remote facility, or an amount of bandwidth available to receive information from the given remote facility. And in another example, the data received from the given remote facility includes one or more of performance, localization, or utilization data regarding equipment or sensors at the given remote facility.

According to another aspect of the technology, a system is configured to provide opportunistic communication between one or more remote facilities and a back end system. The system comprises a fleet of high altitude platforms (HAPs) configured to operate in the stratosphere. Each HAP of the fleet includes a communication system, a navigation system and a control system operatively coupled to the communication and navigation systems. The communication system of each HAP is configured to perform transmission and reception operations with other HAPs in the fleet and with a given one of the one or more remote facilities. The control system for one of the HAPs in the fleet is configured to determine an expected arrive time on station of a selected HAP for a given one of the one or more remote facilities and to communicate via the communication system, to a device of the given remote facility, the expected arrival time on station and a communication window for the selected HAP. Upon arriving on station, the control system of the selected HAP being configured to enable communication between the communication system of the selected HAP and the given remote facility and store data received from the given remote facility in local memory of the selected HAP. The data received from the given remote facility includes information about at least one of component, system or facility operation of the given remote facility. The control system of the selected HAP is also configured to transmit, via the communication system of the selected HAP, the received data from the selected HAP to either another HAP in the fleet of HAPs or to a ground station.

In one example, the one of the HAPs in the fleet is the selected HAP. In other examples the one HAP may be a different HAP. In a further example, at least some of the HAPs of the fleet are lighter-than-air unmanned aerial vehicles. The selected HAP and/or other HAPs of the fleet may be a balloon. And the system may further comprise the ground station.

In another example, the control system for the one of the HAPs in the fleet is configured to identify the selected HAP based on current or projected positions of the HAPs in the fleet relative to the given remote facility. For instance, one or more HAPs may be within a certain geographical distance (e.g., 10-1,000 miles or more or less) of the facility, or may be expected to arrive within communication range of the facility within a certain time (e.g., 1-20 days, or more or less).

In a further example, the control system for the one of the HAPs in the fleet is configured to identify the selected HAP based on an evaluation of a communication capability of a subset of HAPs in the fleet of HAPs. The selected HAP may be configured to communicate to the device of the given remote facility a next expected arrival time on station and a next communication window for another HAP of the fleet of HAPs. Enablement of communication between the selected HAP and the given remote facility may include the selected HAP being configured to transmit an identifier to the given remote facility. The identifier indicates arrival of the selected HAP on station.

In yet another example, the control system of the selected HAP is further configured to process the stored data to obtain processed data. Furthermore, the selected HAP may be configured to store the data received from the given remote facility in the local memory until the selected HAP is within communication range of an authorized ground station, and to transmit the stored data to the authorized ground station upon entering the communication range. The authorized ground station may be part of the system supporting the fleet. Alternatively, the authorized ground station may be a headquarters, central office, warehouse, supply depot or other back-end support facility associated with the given remote facility, for instance to provide logistical support to the given remote facility.

DETAILED DESCRIPTION

Overview

Figure 1:
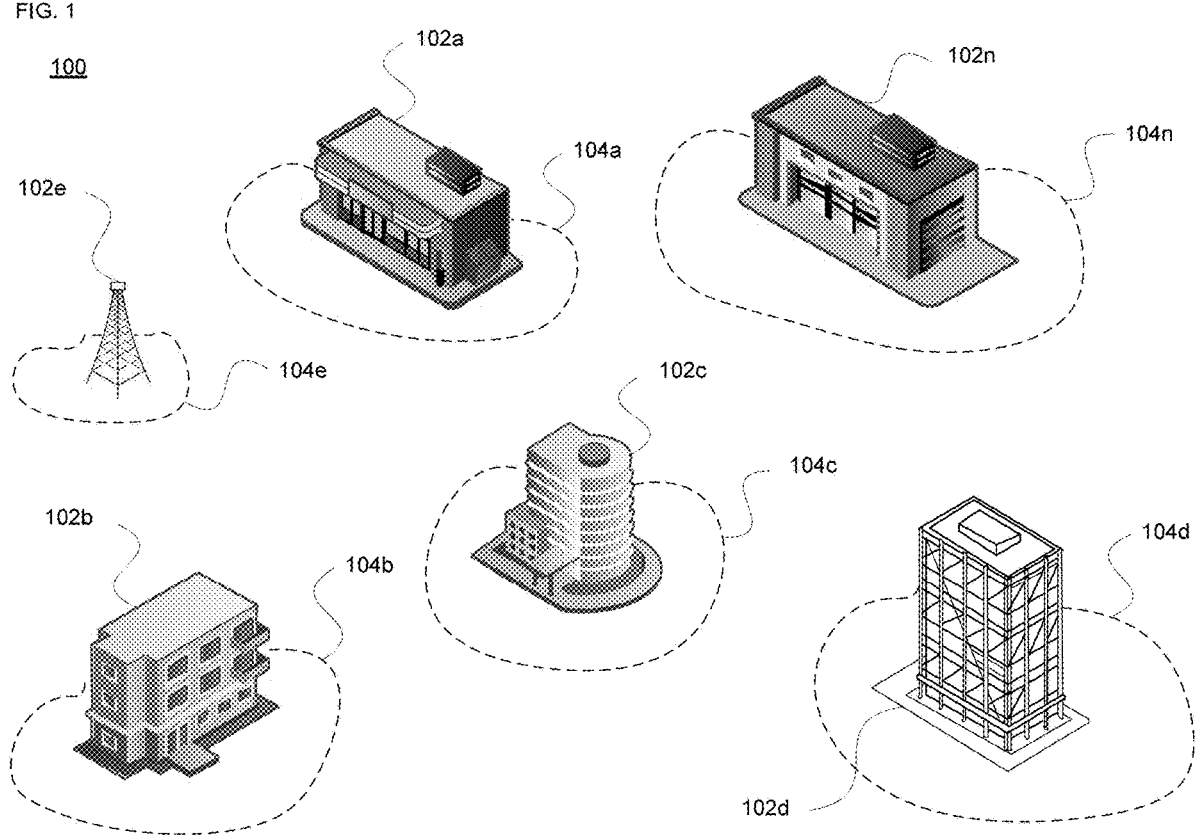
FIG. 1 illustrates an exemplary facilities arrangement in accordance with aspects of the disclosure.

FIG. 1 illustrates an example 100 in which various facilities 102a, 102b, . . . , 102n are at different respective geographic locations 104a, 104b, . . . , 104n as indicated by the dashed lines. The different locations 104 may be separated by tens, hundreds or thousands of miles, be in different countries or on different continents, or otherwise be at different physical locations. In some instance, the facilities may be offshore platforms, such as offshore drilling rigs or buoys. Each of the facilities 102 may have similar or different equipment or sensors used for, e.g., manufacturing, industrial processes or services such as energy generation, mining, agriculture, remote sensing such as seismology for oil and gas exploration, etc.

A given facility may receive or otherwise collect information from its equipment, for instance via one or more sensors on the equipment or positioned at the facility. This information may be used for performance, localization, utilization and/or other metrics, for instance as part of an industrial internet of things (IIoT) approach to enhance productivity, operate more efficiently and/or reduce costs. One way to do this is to provide the collected information to another facility such as a central office that is located remotely.

By way of example, the information may be transmitted to the other facility via one or more airborne platforms (HAPs). A given airborne platform, such as a balloon, airship, drone or other unmanned aerial vehicle (UAV) floating and/or propelled through the stratosphere, may only be in communication range (be "on station") with a particular facility for certain periods of time. In this case, the balloon, UAV or other HAP may be part of a fleet of platforms that are tasked with covering one or more geographic regions. Because the platforms are only periodically available for communication, as discussed below the system may arrange for transmissions from the facilities during certain timeframes, and may use predictions or estimations of balloon or other HAP flight paths to pre-plan or otherwise set up future communication schedules.

Example Systems

Figure 2:
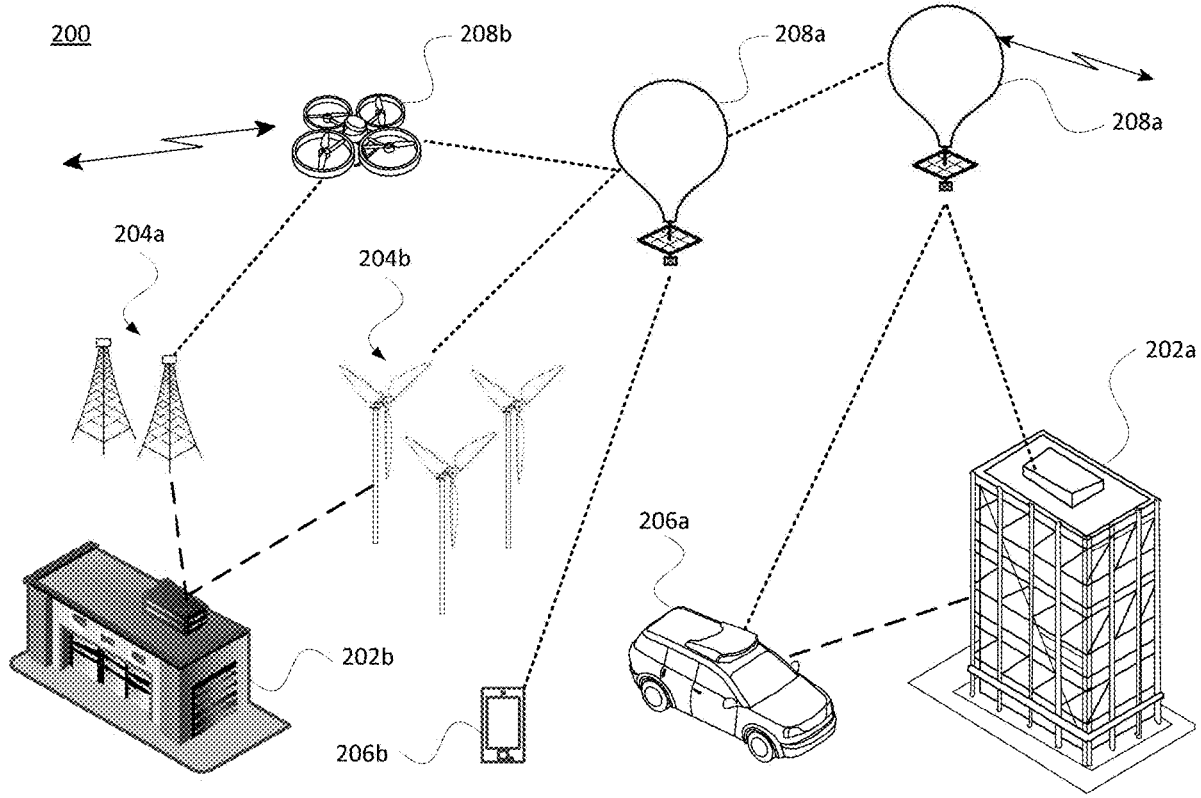
FIG. 2 illustrates an example system in accordance with aspects of the technology.

FIG. 2 illustrates an exemplary system 200 that includes various facilities 202, equipment 204, mobile devices 206, and HAPs 208. For instance, facility 202a may be an industrial facility for manufacturing concrete or other products and facility 202b may be a warehouse, power plant or energy storage unit. The equipment 204 may be, e.g., drill rig assemblies 204a or wind turbines 204b, which may be collocated with the facility or remote therefrom, for instance on offshore platforms. Mobile devices 206 may include autonomous equipment such as a self-driving vehicle 206a or personal communication devices 206b such as a mobile phone, PDA, a tablet, laptop or other computer, etc. And the HAPs 208 may include one or more lighter-than-air balloons 208a and/or drones 208b or other mobile platforms as discussed herein.

As shown by the dotted lines, the HAPs may provide direct and/or indirect communication links with ground devices or other HAPs. This may be bidirectional or unidirectional communication. And as shown by the jagged lines, the HAPs may communicate with ground stations or other equipment (not shown). By way of example, any of the facilities 202, equipment 204 and/or mobile devices 206 may be configured to wirelessly communicate directly with a given HAP 208. This may be via radio frequency (RF) or optical communication. Alternatively, the equipment 204 and/or mobile devices 206 may only communicate directly with a nearby facility 202 as shown by the dashed lines. In turn, the nearby facility is able to communicate with the HAP(s) 208. For instance, facility 202b may receive health status or productivity information periodically transmitted by each of the drill rig assemblies 204a or wind turbines 204b.

Figure 3:
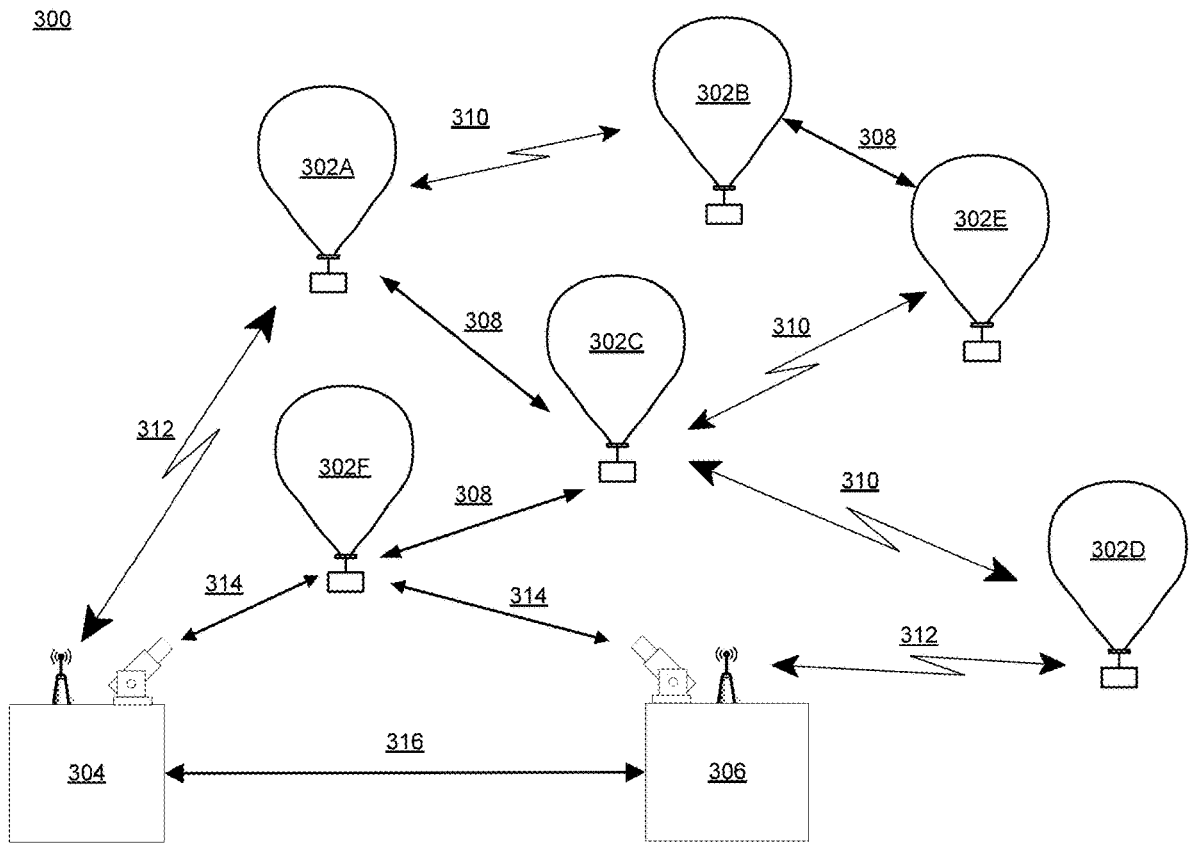
FIG. 3 illustrates an example transitory communication system in accordance with aspects of the technology.

FIG. 3 depicts an example transitory communication system 300 in which a fleet of balloon platforms or other HAPs described above may be used. This example should not be considered as limiting the scope of the disclosure or usefulness of the features described herein. System 300 may be considered a balloon network. In this example, balloon network 300 includes a plurality of devices, such as balloons 302A-F as well as ground-based stations 304 and 306. Balloon network 300 may also include a plurality of additional devices, such as various computing devices (not shown) as discussed in more detail below or other systems that may participate in the network.

The devices in system 300 are configured to communicate with one another. As an example, the balloons may include communication links 308 and/or 310 in order to facilitate intra-balloon communications. By way of example, links 310 may employ radio frequency (RF) signals (e.g., millimeter wave transmissions) while links 308 employ free-space optical transmission. Alternatively, all links may be RF, optical, or a hybrid that employs both RF and optical transmission. In this way balloons 302A-F may collectively function as a mesh network for data communications. At least some of the balloons may be configured for communications with ground-based stations 304 and 306 via respective links 312 and 314, which may be RF and/or optical links. In addition, the ground-based stations 304 and 306 may communicate directly via link 316, which may be a wired or wireless link.

In one scenario, a given balloon 302 may be configured to transmit an optical signal via an optical link 308. Here, the given balloon 302 may use one or more high-power light-emitting diodes (LEDs) to transmit an optical signal. Alternatively, some or all of the balloons 302 may include laser systems for free-space optical communications over the optical links 308. Other types of free-space communication are possible. Further, in order to receive an optical signal from another balloon via an optical link 308, the balloon may include one or more optical receivers.

The balloons 302 may also utilize one or more of various RF air-interface protocols for communication with ground-based stations via respective communication links. For instance, some or all of balloons 302A-F may be configured to communicate with ground-based stations 304 and 306 via RF links 312 using various protocols described in IEEE 802.11 (including any of the IEEE 802.11 revisions), cellular protocols such as GSM, CDMA, UMTS, EV-DO, WiMAX, and/or LTE, 5G and/or one or more proprietary protocols developed for long distance communication, among other possibilities.

In some examples, the links may not provide a desired link capacity for balloon-to-ground communications. For instance, increased capacity may be desirable to provide backhaul links from a ground-based gateway. Accordingly, an example network may also include downlink balloons, which could provide a high-capacity air-ground link between the various balloons of the network and the ground-base stations. For example, in balloon network 300, balloon 302F may be configured as a downlink balloon that directly communicates with station 304 and/or 306.

Like other balloons in network 300, downlink balloon 302F may be operable for communication (e.g., RF or optical) with one or more other balloons via link(s) 308, 310. Downlink balloon 302F may also be configured for free-space optical communication with ground-based stations 304 and/or 306 via an optical links 314. Optical link 314 may therefore serve as a high-capacity link (as compared to an RF link 312) between the balloon network 300 and the ground-based station 304 or 306. Downlink balloon 302F may additionally be operable for RF communication with ground-based stations 304 or 306. In other cases, downlink balloon 302F may only use an optical link for balloon-to-ground communications. Further, while the arrangement shown in FIG. 3 includes just one downlink balloon 102F, an example balloon network can also include multiple downlink balloons. On the other hand, a balloon network can also be implemented without any downlink balloons.

A downlink balloon may be equipped with a specialized, high bandwidth RF communication system for balloon-to-ground communications, instead of, or in addition to, a free-space optical communication system. The high bandwidth RF communication system may take the form of an ultra-wideband system, which may provide an RF link with substantially the same capacity as one of the optical links 314.

In a further example, some or all of balloons 302A-F could be configured to establish a communication link with space-based satellites and/or other types of HAPs (e.g., drones, airplanes, airships, etc.) in addition to, or as an alternative to, a ground based communication link. In some embodiments, a balloon may communicate with a satellite or a high altitude platform via an optical or RF link. However, other types of communication arrangements are possible.

As noted above, the balloons 302A-F may collectively function as a mesh network. More specifically, since balloons 302A-F may communicate with one another using free-space optical links, the balloons may collectively function as a free-space optical mesh network. In a mesh-network configuration, each balloon may function as a node of the mesh network, which is operable to receive data directed to it and to route data to other balloons. As such, data may be routed from a source balloon to a destination balloon by determining an appropriate sequence of links between the source balloon and the destination balloon.

The network topology may change as the balloons move relative to one another and/or relative to the ground or to different facilities, equipment or mobile devices. Accordingly, the balloon network 300 may apply a mesh protocol to update the state of the network as the topology of the network changes. For example, to address the mobility of the balloons 302A to 302F, the balloon network 300 may employ and/or adapt various techniques that are employed in mobile ad hoc networks (MANETs). Other examples are possible as well.

Balloon network 300 may also implement station-keeping functions using stratospheric winds, altitude control and/or lateral propulsion to help provide a desired network topology, to maintain connectivity with one or more locations on the ground, or both. For example, station-keeping may involve fleet planning whereby some or all of balloons 302A-F maintain coverage and/or move into a certain position relative to one or more other balloons in the network, or relative to a particular ground-based station, service area, facility, etc. As part of this process, each balloon may implement station-keeping functions to determine its desired positioning, and if necessary, to determine how to move to and/or maintain the desired positioning.

The desired topology or fleet plan may vary depending upon the particular implementation and whether or not the balloons are continuously moving. In some cases, balloons may implement station-keeping to provide a certain coverage capability, where the balloons function to position themselves in particular geographic regions, or within a certain range of distances from neighboring balloons in the network 300. Alternatively, the balloon network 300 may have a non-uniform or non-contiguous topology where balloons are distributed more or less densely in certain areas, for various reasons. As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network, or to provide coverage to particular locations, facilities, etc.

The balloons of FIG. 3 may be high-altitude balloons that are deployed in the stratosphere. As an example, in a high altitude balloon network, the balloons may generally be configured to operate at stratospheric altitudes, e.g., between 50,000 ft and 90,000 ft or more or less, in order to limit the balloons' exposure to high winds and interference with commercial airplane flights. In order for the balloons to provide desired coverage in the stratosphere, where winds may affect the locations of the various balloons in an asymmetrical manner, the balloons may be configured to move latitudinally and/or longitudinally (transversely) by adjusting their respective altitudes, such that the wind carries the respective balloons to the respectively desired locations. Lateral propulsion may also be employed to affect a balloon's path of travel or to maintain time "on station" over a particular region.

Figure 4:
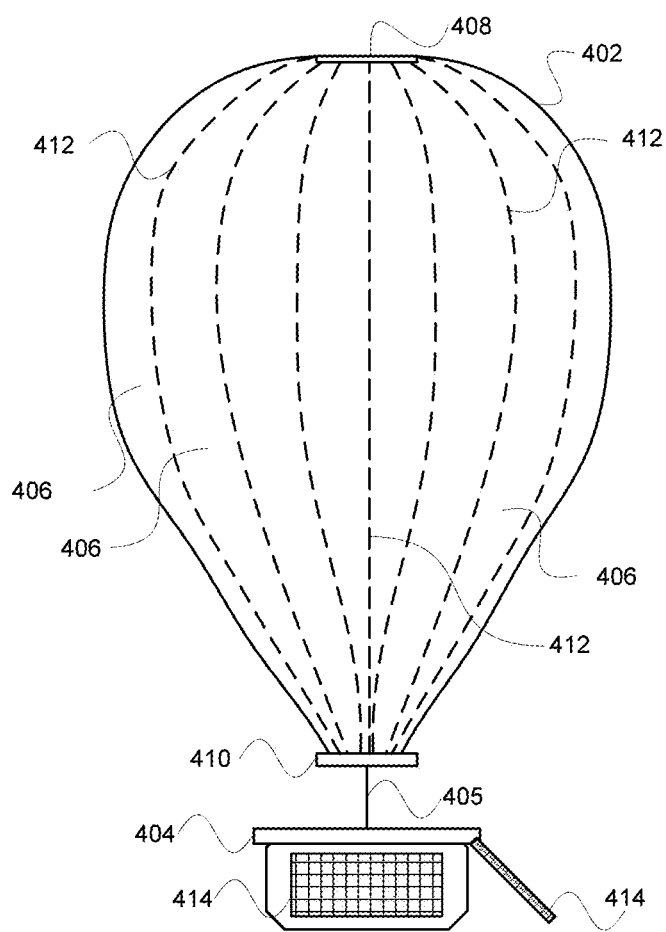
FIG. 4 illustrates an example high-altitude balloon in accordance with aspects of the technology.

In an example configuration, the high altitude balloon platforms include an envelope and a payload, along with various other components. FIG. 4 is one example of a high-altitude balloon 400, which may represent any of the balloons of FIGS. 2-3. As shown, the example balloon 400 includes an envelope 402 and a payload 404 coupled to the envelope via a tether or other connection member 405. The balloon 400 may be configured, e.g., as a superpressure balloon and include one or more ballonets (not shown).

In a superpressure or other balloon arrangement, the envelope 402 may be formed from a plurality of gores 406 sealed to one another. An upper portion of the envelope 402 has an apex section configured for connection to an apex load ring 408, and a lower portion having a base section configured for connection to a base load ring 410 positioned at the bottom of the balloon envelope. Tendons (e.g., webbing or load tape) 412 are shown running longitudinally from the apex load ring 408 to the base load ring 410. The tendons are configured to provide strength to the gores and to help the envelope 402 withstand the load created by the pressurized gas within the envelope when the balloon is in use. There may be a 1:1 correspondence between the number of gores and the number of tendons. Alternatively, there may be more (or less) tendons than gores.

The envelope 402 may take various shapes and forms. For instance, the envelope 402 may be made of materials such as polyethylene, mylar, FEP, rubber, latex or other thin film materials or composite laminates of those materials with fiber reinforcements imbedded inside or outside. Other materials or combinations thereof or laminations may also be employed to deliver required strength, gas barrier, RF and thermal properties. Furthermore, the shape and size of the envelope 402 may vary depending upon the particular implementation. Additionally, the envelope 402 may be filled with different types of gases, such as air, helium and/or hydrogen. Other types of gases, and combinations thereof, are possible as well. Shapes may include typical balloon shapes like spheres and "pumpkins", or aerodynamic shapes that are symmetric, provide shaped lift, or are changeable in shape. Lift may come from lift gasses (e.g., helium, hydrogen), electrostatic charging of conductive surfaces, aerodynamic lift (wing shapes), air moving devices (propellers, wings, electrostatic propulsion, etc.) or any hybrid combination of lifting techniques. One or more solar panels 414 may be arranged on or extending from the chassis of the payload 404.

Figure 5:
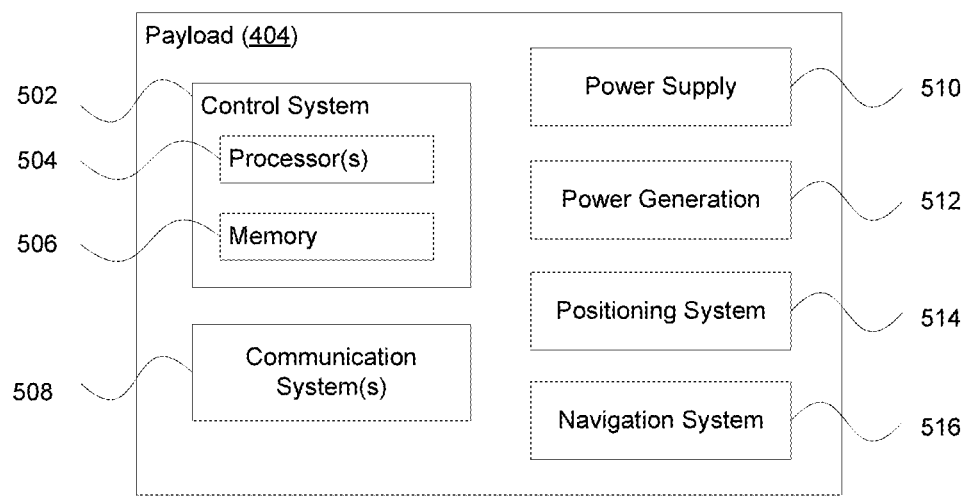
FIG. 5 illustrates an example payload of a high altitude platform in accordance with aspects of the technology.

According to one example 500 shown in FIG. 5, payload 404 may include a control system 502 having one or more processors 504 and on-board data storage in the form of memory 506. Memory 506 stores information accessible by the processor(s) 504, including instructions that can be executed by the processors. The memory 506 also includes data that can be retrieved, manipulated or stored by the processor. By way of example, the data may include data received from various remote facilities, such as performance, localization, utilization or other data regarding equipment and sensors at such facilities.

The memory can be of any non-transitory type capable of storing information accessible by the processor, such as a hard-drive, memory card, ROM, RAM, and other types of write-capable, and read-only memories. The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. The data can be retrieved, stored or modified by the one or more processors 304 in accordance with the instructions.

The one or more processors 504 can include any conventional processors, such as a commercially available CPU. Alternatively, each processor can be a dedicated component such as an ASIC, controller, or other hardware-based processor. Although FIG. 5 functionally illustrates the processor(s) 504, memory 506, and other elements of control system 502 as being within the same block, the system can actually comprise multiple processors, computers, computing devices, and/or memories that may or may not be stored within the same physical housing. For example, the memory can be a hard drive or other storage media located in a housing different from that of control system 502. Accordingly, references to a processor, computer, computing device, or memory will be understood to include references to a collection of processors, computers, computing devices, or memories that may or may not operate in parallel.

The payload 404 may also include various other types of equipment and systems to provide a number of different functions. For example, as shown the payload 404 includes one or more communication systems 508, which may transmit signals via RF and/or optical links as discussed above. The communication system(s) 508 include communication components such as one or more transmitters and receivers (or transceivers), one or more antennae, and a baseband processing subsystem. (not shown).

The payload 404 is illustrated as also including a power supply 510 to supply power to the various components of balloon. The power supply 310 could include one or more rechargeable batteries or other energy storage systems like capacitors or regenerative fuel cells. In addition, a power generation system 512 may be included in addition to or as part of the power supply. The power generation system 512 may include solar panels such as panels 414 of FIG. 4, stored energy (hot air), relative wind power generation or differential atmospheric charging (not shown), or any combination thereof, and could be used to generate power that charges and/or is distributed by the power supply 510.

The payload 404 may additionally include a positioning system 514. The positioning system 514 could include, for example, a global positioning system (e.g., GPS and/or GLONASS), an inertial navigation system, and/or a star-tracking system. The positioning system 514 may additionally or alternatively include various motion sensors (e.g., accelerometers, magnetometers, gyroscopes, and/or compasses). The positioning system 514 may additionally or alternatively include one or more video and/or still cameras, and/or various sensors for capturing environmental data. Some or all of the components and systems within payload 404 may be implemented in a radiosonde or other probe, which may be operable to measure, e.g., pressure, altitude, geographical position (latitude and longitude), temperature, relative humidity, and/or wind speed and/or wind direction, among other information. Wind sensors may include different types of components like pitot tubes, hot wire or ultrasonic anemometers or similar, windmill or other aerodynamic pressure sensors, laser/lidar, or other methods of measuring relative velocities or distant winds.

Payload 404 may include a navigation system 516 separate from, or partially or fully incorporated into control system 502. The navigation system 516 may implement station-keeping functions to maintain position within and/or move to a position in accordance with a desired topology or other service requirement, for instance to gather data from one or more facilities. In particular, the navigation system 516 may use wind data (e.g., from onboard and/or remote sensors) to determine altitudinal and/or lateral positional adjustments that result in the wind carrying the balloon in a desired direction and/or to a desired location. Lateral positional adjustments may also be handled directly by a lateral positioning system that is separate from the payload. Alternatively, the altitudinal and/or lateral adjustments may be computed by a central control location and transmitted by a ground based, air based, or satellite based system and communicated to the high-altitude balloon. In other embodiments, specific balloons may be configured to compute altitudinal and/or lateral adjustments for other balloons and transmit the adjustment commands to those other balloons.

Figure 6:
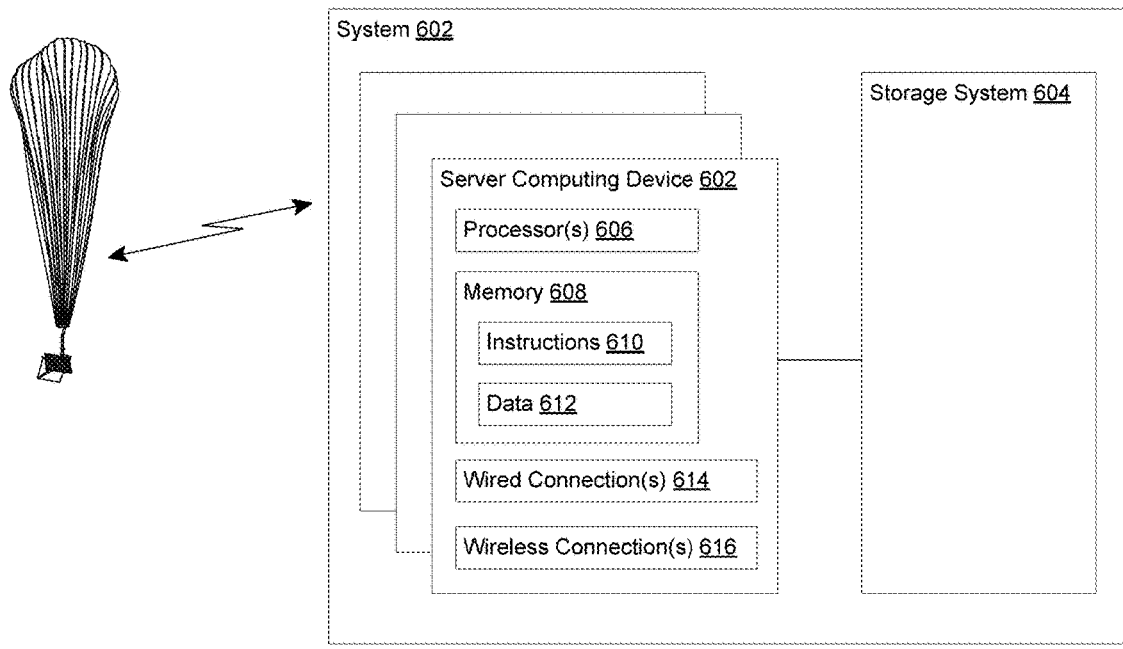
FIG. 6 illustrates an example server system in accordance with aspects of the technology.

As noted above with regard to FIG. 3, the balloons (or other HAPs) may communicate directly or indirectly with ground-based stations. FIG. 6 illustrates one example 600 in which a balloon (e.g., balloon 400 of FIG. 4) is in communication with a station such as a server system 602. As shown, the server system 602 includes one or more server computing devices 602 and a storage system 604. In one scenario, each ground base station 304 and 306 of FIG. 3 may be a datacenter including the storage system 604 as well as the server computing devices 602. In this regard, the server computing devices may function as a load balanced server farm, cloud computing center or other processing hub in order to exchange information with different nodes of various networks for the purpose of receiving, processing and transmitting the data to and from other computing devices. As such, each of the one or more server computing devices 602 may include one or more processors 606, memory 608 and other components typically present in general purpose computing devices.

The memory 608 stores information accessible by the one or more processors 602, including instructions 610 and data 612 that may be executed or otherwise used by the processors 602. The memory 608 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

Similar to the instructions stored in memory 506, the instructions 610 may be any set of instructions to be executed directly (such as machine code) or indirectly (such as scripts) by the processor. For example, the instructions may be stored as computing device code on the computing device-readable medium. The data 612 may be retrieved, stored or modified by processor 420 in accordance with the instructions 434. For instance, although the claimed subject matter is not limited by any particular data structure, the data may be stored in computing device registers, in a relational database as a table having a plurality of different fields and records, XML documents or flat files. The data may also be formatted in any computing device-readable format. For instance, data may store information about the expected location of the sun relative to the earth at any given point in time as well as information about the location of network targets.

The one or more processors 602 may be any hardware-based processors, such as commercially available central processing units (CPUs), graphics processing units (GPUs), and/or tensor processing units (TPUs). Alternatively, the one or more processors may be a dedicated device such as an ASIC or other hardware-based processor. Although FIG. 6 functionally illustrates the processor, memory, and other elements of computing device 602 as being within the same block, it will be understood that the processor, computing device, or memory may actually include multiple processors, computing devices, or memories that may or may not be stored within the same physical housing. For example, memory may be a hard drive or other storage media located in a housing different from that of server computing devices 602. Accordingly, references to a processor or computing device will be understood to include references to a collection of processors or computing devices or memories that may or may not operate in parallel.

The server computing devices 602 may also include one or more wired connections 614 and/or wireless connections 616 to facilitate communication with other devices, such as other server computing devices 602 and the storage system 604, one or more information services, and other devices of the network. These information services may include, for instance, systems that provide weather predictions from organizations such as the National Oceanic and Atmospheric Administration (NOAA) or the European Centre for Medium-Range Weather Forecasts (ECMWF). The wireless network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Storage system 604 may store various types of information, including data received from one or more HAPs that was transmitted by various remote facilities. This information may be retrieved or otherwise accessed by one or more server computing devices, such as the server computing devices 602, in order to perform some or all of the features described herein, including data analysis, error correction, preprocessing or other operations prior to transmission to or retrieval by an entity associated with the remote facilities. As with memory 608, storage system 604 can be of any type of computer storage capable of storing information accessible by the server computing devices 410, such as a hard-drive, memory card, ROM, RAM, DVD, CD-ROM, write-capable, and read-only memories. In addition, storage system 604 may include a distributed storage system where data is stored on a plurality of different storage devices which may be physically located at the same or different geographic locations.

Storage system 604 may be connected to the server computing devices 602 directly (e.g., as part of server computing devices 602 and/or via wired connections 614) and/or via a network (e.g., via wired connections 614 and/or wireless connections 616). This network may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

EXAMPLE CONFIGURATIONS

Industrial equipment and sensors as described above can be equipped with local data and signal processing modules. Such devices can take measurements regarding component, system and facility operation. By way of example, sensor types may include but are not limited to pressure, temperature, flow, vibration, power generation, run status, asset location, etc. Any other type information available from a local control system may also be stored for transmission to a headquarters or central office facility.

Figure 7A:
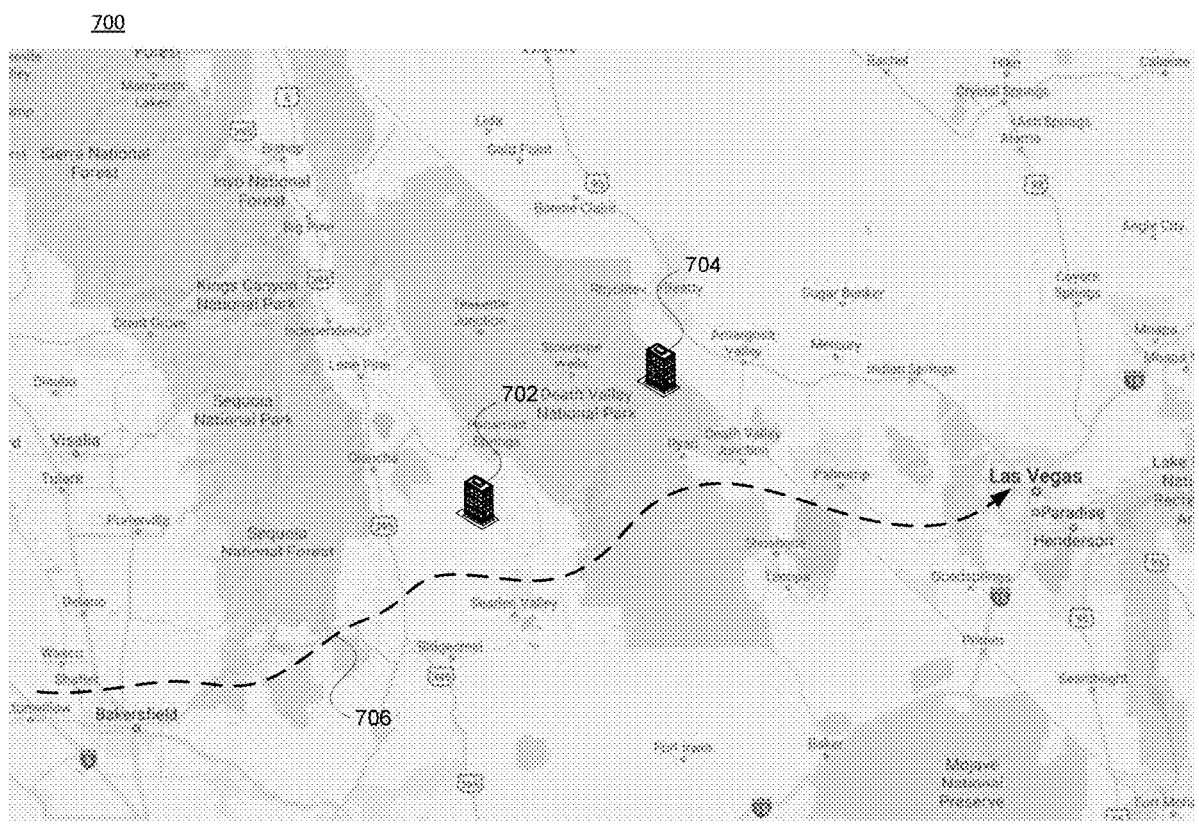
FIGS. 7A-B illustrate an example scenario for opportunistic communication with remote facilities according to aspects of the technology.
Figure 7B:
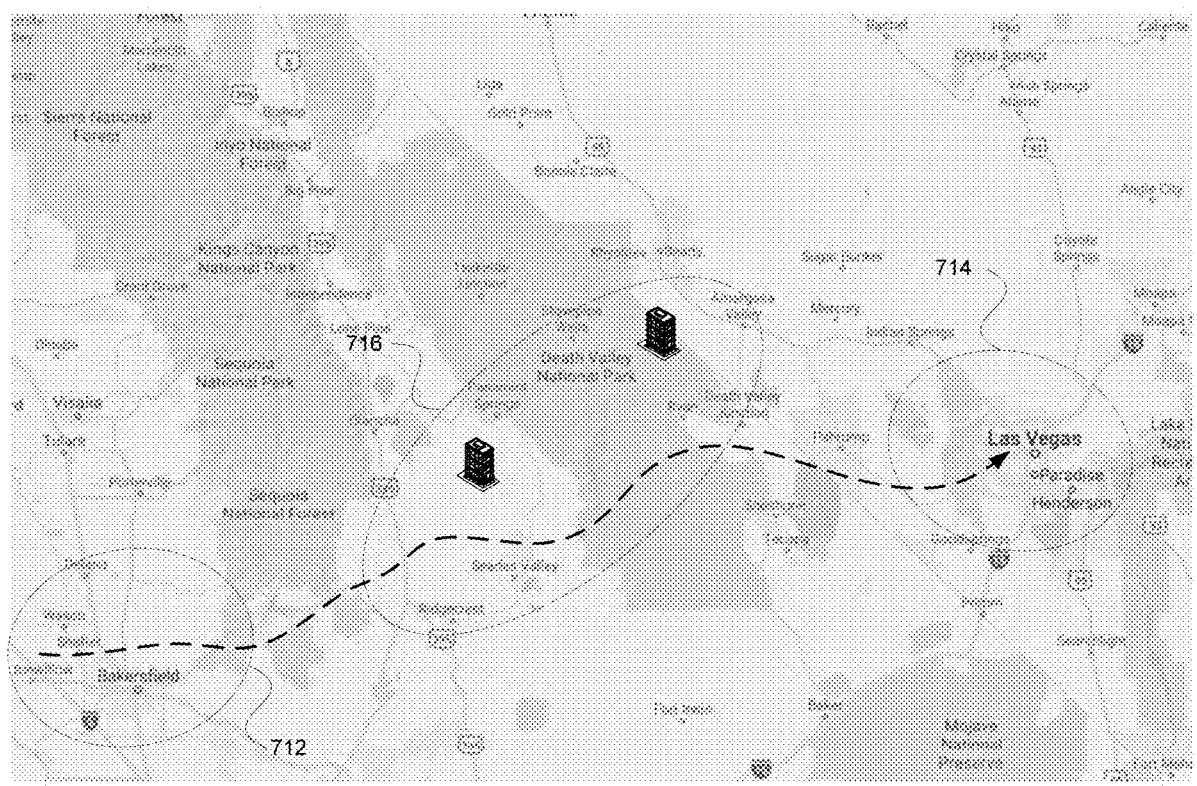

FIGS. 7A-B illustrate an example scenario in which one or more HAPs can opportunistically communication with remote facilities. For instance, map 700 of FIG. 7A illustrates a region that may be sparsely populated. As shown, different remote facilities 702 and 704 may be located between Bakersfield and Las Vegas. Each facility may have various systems, equipment, components and/or sensors gathering information about performance, localization, utilization and/or other metrics. This information may or may not be time sensitive, and may or may not require high bandwidth to transmit. In this figure, dashed line 706 illustrates a path that a given balloon or other HAP may traverse as it travels from Bakersfield to Las Vegas.

As shown by the dotted lines in map 710 of FIG. 7B, the HAP may have a first coverage area 712 over Bakersfield and a second coverage area 714 over Las Vegas, e.g., to provide telecommunication, video streaming or other services to customers in those regions. According to one scenario, after the HAP leaves the Bakersfield region and before it arrives at the Las Vegas region, it may not be providing such services to customers. In this case, the HAP may have the capability of servicing remote facilities along the route. In particular, as shown by dash-dot area 716, the HAP may be able to communicate with the facilities 702 and 704.

According to one aspect, telecommunication, video or other data transmission services to specified regions may be a primary function of the HAP. However, as the HAP transits between the specified service regions, it is able to provide support services to other customers, which may include the remote facilities. In this way, a HAP fleet can provide opportunistic communication to facilities that otherwise would have to use other communication means that may be more expensive, less reliable or become outdated due to changing equipment.

Figure 8A:
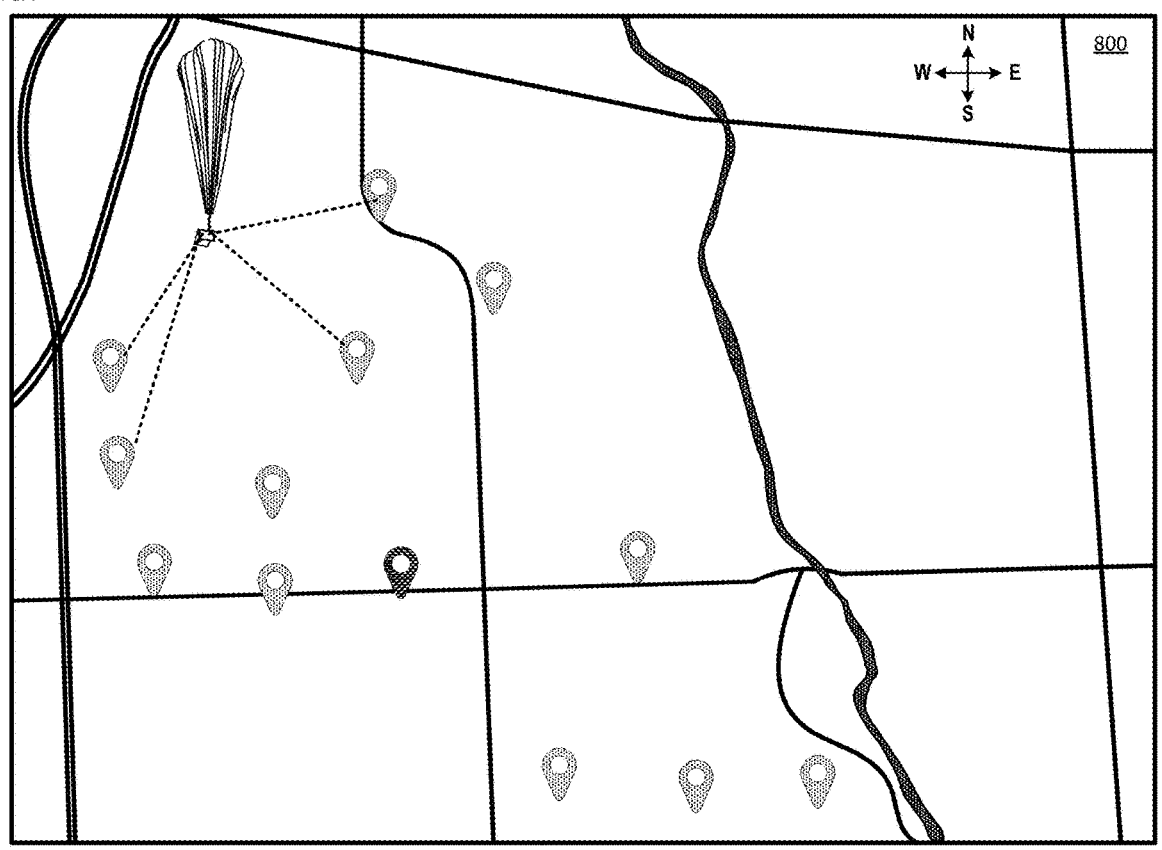
FIGS. 8A-B illustrate an example of concurrent communication with multiple remote facilities in accordance with aspects of the technology.
Figure 8B:
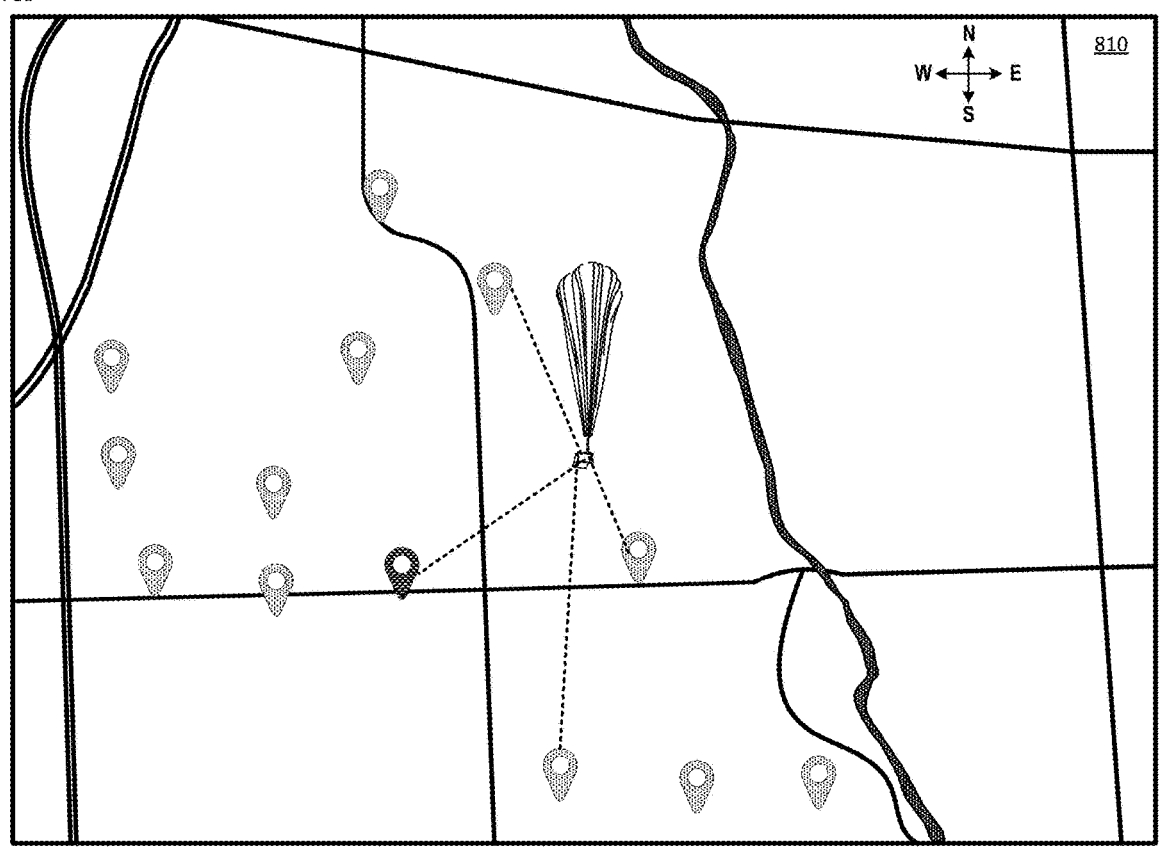

In one example, when the HAP is arriving on station, it may transmit an identifier or other message to a given facility to let it know. The facility, e.g., facility 702 of FIG. 7A, can then transmit information from its systems, equipment, components and/or sensors to the HAP, for instance via RF or optical communication as described above. As the HAP is leaving communication range, the facility may cease transmission, for instance in response to a notification from the HAP that it is departing station. This may be repeated each time the HAP is in communication range with another facility. Should the HAP be in communication range with multiple facilities at the same time, depending on the communication arrangement and amounts of data to be transmitted, the HAP may receive information from different facilities at the same time, sequentially, or according to some other transmission schedule. FIGS. 8A and 8B illustrate two views 800 and 810, respectively, that show via the dotted lines that the HAP may concurrently communicate with different facilities, systems or remote components directly as the HAP moves from one location to another.

In one scenario, the locally acquired data can be stored and processed at the facility. In this case, the data then will be transferred in processed form to a HAP. This data connection can either be continuous or in a periodic burst transmission mode when a HAP or series of HAPS is within communication range of the facility. Unprocessed (raw) or partially processed data may also be transmitted to the HAP. In this case, such data may be processed by a computing system of the HAP, or may be shared with other HAPs in the network for a distributed processing approach. For instance, the processing may include performing data analysis regarding device or system productivity, a mean time between failures (MTBF) projection, just-in-time (JIT) evaluation for resupply or inventory management, etc. Alternatively, data received from a remote facility may be maintained by the HAP without processing, and then provided to a ground station (e.g., back office system, cloud storage, etc.), where the data can be processed and evaluated offline.

The data acquired by the HAP will be relayed to a ground station either directly or by relay to another HAP. This acquired data can be transmitted to the end user (e.g., corporate headquarters, OEM, etc.) or stored in a cloud computing platform for further analysis, predictive analytics, etc. Regardless of where the processing occurs, the processed data can be used by the end user, OEM, customer or other entity for one or more of the following functions: predictive maintenance intervals, early diagnostic of system failures, troubleshooting, calculation of run time for commercial billing, asset tracking (e.g., geo tracking of mobile assets), energy management, or any other purpose.

As noted above, in some instances the data transmitted from a given facility may be of low bandwidth (e.g., highly compressed images or data files) or otherwise require low data rate transmissions (e.g., 1-100 kbps). The amount of data to transmit and the time the HAP is on station can be evaluated by the facility, the HAP, or a ground station to determine how and when to transmit the data efficiently. In one scenario, when a first HAP is on station can provide information to the facility about when the same or another HAP will next be on station. For instance, while a fleet of HAPs may provide continuous coverage over certain service areas (e.g., Bakersfield and Las Vegas in FIGS. 7A-B), the fleet may only provide intermitting coverage in other areas where the facilities are located. Thus, in this scenario, the first HAP may indicate to the facility that a HAP will next be on station in 24 hours, 1 week, or more or less. This indication may include a particular time of day, a timeframe for transmission, bandwidth capabilities and/or other information to enable effective communication between the facility and the HAP. In one example, a HAP arriving on station can transmit a beacon or other identifier to the facility to announce its arrival. This identifier may include information about the HAP's communication capabilities (e.g., RF and/or optical communication, protocols supported, equipment supported, etc.), amount of time or bandwidth available to receive information from the facility, or other information to enable the facility to prepare to transmit its data. The beacon or other identifier may be transmitted in a way to enable the facility to be notified prior to the time when the HAP is within communication range for the facility to begin transmitting data to the HAP.

In order to determine when a next HAP will be on station, a ground station or one or more HAPs in the fleet may analyze current flight information (e.g., current location, heading, speed, altitude, weather conditions, etc.), projected flight information (e.g., future weather patterns, coverage requirements or goals, predicted power availability, etc.), bandwidth and data storage capabilities and constraints, and/or other information. This analysis may include identifying one or more target facilities which a given HAP or series of HAPs may opportunistically support. Based on this, a flight plan for the given HAP or series of HAPs is generated and provided to the control system of the respective platform(s). Each respective HAP can then adjust or maintain its various flight systems (e.g., navigation and positioning systems as shown in FIG. 5) as necessary in order to arrive on station at the one or more target facilities.

Thus, a HAP fleet can effectively support off-peak data transmission and reception, as well as secondary use cases or business models to supplement primary operation. This can provide a supplemental income stream to the operator of the fleet when the HAPs are transiting between primary service areas.

EXAMPLE METHODS

Figure 9:
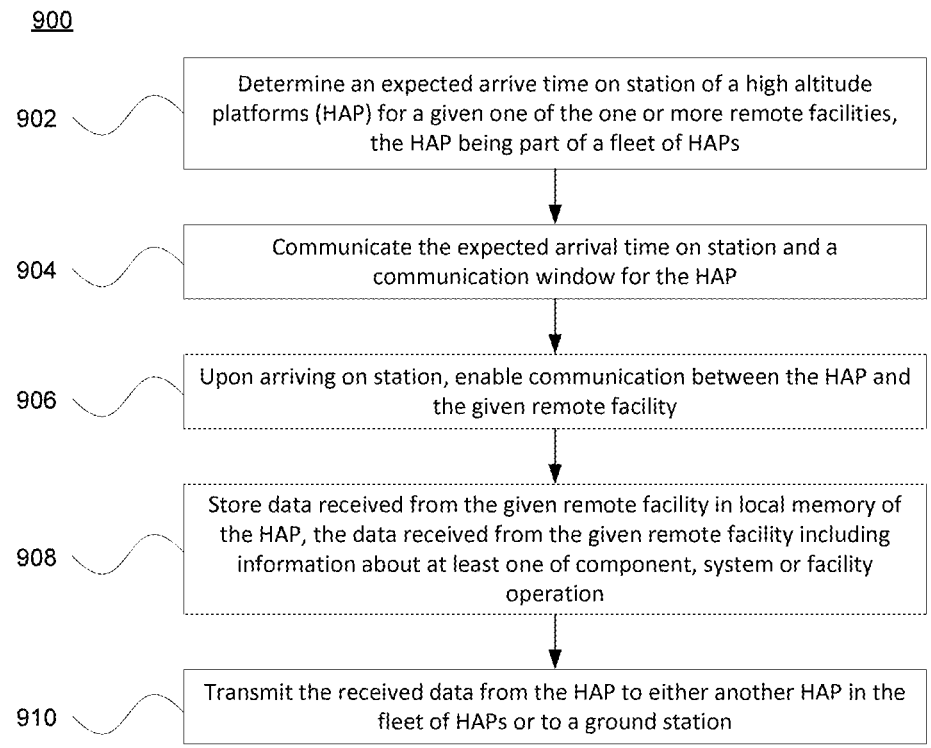
FIG. 9 is a flow diagram of system operation in accordance with aspects of the technology.

FIG. 9 illustrates an example 900 of a method of providing opportunistic communication between one or more remote facilities and a back end system. At block 902, the method includes determining an expected arrive time on station of a high altitude platforms (HAP) for a given one of the one or more remote facilities. The HAP is part of a fleet of HAPs. At block 904, the expected arrival time on station and a communication window for the HAP are communicated to the given remote facility. This may be done, for instance, by another HAP in the fleet, communication via a satellite or other link, etc. At block 906, upon arriving on station, communication is enabled between the HAP and the given remote facility. This may include, e.g., a handshake connection to verify device authenticity, device status, the communication protocol(s) to employ, and/or other precursor actions prior to data transmission. Once data from the given remote facility has been transmitted to the HAP, at block 908 the received data is stored in local memory of the HAP. Here, the data received from the given remote facility includes information about at least one of component, system or facility operation associated with the given remote facility. Then at block 910, the received data is subsequently transmitted from the HAP to either another HAP in the fleet of HAPs or to a ground station. By way of example, this can occur after the HAP leaves the area of the given remote facility and is no longer on station at that facility. Passing the data to another HAP may be part of a mesh networking approach. Alternatively, the data may be passed directly to the ground station once the HAP is on station at the ground station's geographical location.

While these processes are shown in the flow diagram in one order, they may be performed in a different order or in parallel depending on system needs or requirements.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only

The invention claimed is:

1. A method of providing opportunistic communication using a high altitude platform (HAP) configured to operate in the stratosphere, the method comprising:
providing, by the high altitude platform (HAP) during a first period of time, a first communication service to one or more customers of a service region;
transmitting to a device of a remote facility outside of the service region, by one or more processors, an expected arrival time on station and a communication window for the HAP at the remote facility during a second period of time, wherein the second period of time does not overlap with the first period of time;
after departing the service region and upon arriving on station at the remote facility, enabling a second communication service between the HAP and the remote facility, the second communication service being different from the first communication service; and
transmitting to the device of the remote facility a next expected arrival time on station and a next communication window for using the second communication service.

2. The method of claim 1, wherein transmitting the expected arrival time on station and the communication window is performed by the HAP.

3. The method of claim 1, wherein the service region is a first service region, and the HAP communicates with the remote facility according to the second communication service prior to the HAP providing the first communication service to one or more customers of a second service region during a second period of time.

4. The method of claim 3, wherein the remote facility is located between the first service region and the second service region.

5. The method of claim 1, wherein the first communication service comprises a telecommunication service.

6. The method of claim 1, wherein the first communication service comprises a video service.

7. The method of claim 1, further comprising determining, by the one or more processors, the expected arrive time on station of the HAP.

8. The method of claim 1, wherein the second communication service is at least one of bandwidth-limited or rate-limited according to a predetermined constraint.

9. The method of claim 1, wherein:
the HAP is part of a fleet of HAPs; and
the next expected arrival time on station and the next communication window are for a different HAP of the fleet of HAPs.

10. The method of claim 9, wherein the next expected arrive time on station is based on analysis of at least one of current flight information, projected flight information, bandwidth or data storage capabilities of the different HAP.

11. The method of claim 1, wherein enabling the second communication service between the HAP and the remote facility includes the HAP transmitting an identifier to the remote facility, the identifier indicating arrival of the HAP on station at the remote facility.

12. The method of claim 1, wherein:
the remote facility is a first remote facility of a plurality of remote facilities each located outside of the service region; and
the method further includes the HAP providing the second communication service to one or more other remote facilities of the plurality of remote facilities during the second period of time.

13. The method of claim 12, further comprising arranging for the HAP to receive information from the first remote facility and the one or more other remote facilities at the same time.

14. The method of claim 12, further comprising arranging for the HAP to receive information from the first remote facility and the one or more other remote facilities sequentially.

15. The method of claim 12, further comprising arranging for the HAP to receive information from the first remote facility and the one or more other remote facilities according to a selected transmission schedule.

16. The method of claim 1, wherein data received by the HAP from the remote facility during the communication window according to the second communication service includes one or more of performance, localization, or utilization data regarding equipment or sensors at the remote facility.

17. The method of claim 16, further comprising processing the data by (i) performing data analysis regarding device or system productivity, (ii) performing a mean time between failures (MTBF) projection, or (iii) performing a just-in-time (JIT) evaluation for resupply or inventory management.

18. The method of claim 17, wherein processing the data is performed by one or more computing devices of the HAP.

19. The method of claim 18, further comprising:
transmitting the data received by the HAP from the remote facility to a ground station;
wherein processing the data is performed by one or more computing devices of the ground station.

20. A system configured to provide opportunistic communication between one or more remote facilities and a back end system, the system comprising:
a fleet of high altitude platforms (HAPs) configured to operate in the stratosphere, each HAP of the fleet including a communication system, a navigation system and a control system operatively coupled to the communication and navigation systems, wherein the communication system of each HAP is configured to perform transmission and reception operations with other HAPs in the fleet and with a given one of the one or more remote facilities;
the control system for one of the HAPs in the fleet being configured to:
provide, during a first period of time, a first communication service to one or more customers of a service region;
transmit, to a device of the given remote facility outside of the service region, an expected arrival time on station and a communication window for the HAP at the given remote facility during a second period of time, wherein the second period of time does not overlap with the first period of time;
after departure from the service region and upon arrival on station at the remote facility, enable a second communication service between the HAP and the given remote facility, the second communication service being different from the first communication service; and
transmit, to the device of the given remote facility, a next expected arrival time on station and a next communication window for using the second communication service.

* * * * *